US012457191B2

(12) United States Patent
Natale et al.

(10) Patent No.: US 12,457,191 B2
(45) Date of Patent: Oct. 28, 2025

(54) USER PLANE FUNCTION CONFIGURED TO PRIORITIZE USING A PREFERRED INTERNET PROTOCOL TO ESTABLISH A CONNECTION BETWEEN USER DEVICE AND HOST SERVER

(71) Applicant: T-Mobile USA, Inc., Bellevue, WA (US)

(72) Inventors: Cesare Natale, Frisco, TX (US); Saravana Velusamy, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 373 days.

(21) Appl. No.: 18/179,292

(22) Filed: Mar. 6, 2023

(65) Prior Publication Data

US 2024/0305602 A1 Sep. 12, 2024

(51) Int. Cl.
*H04W 76/10* (2018.01)
*H04L 61/4511* (2022.01)
*H04L 101/686* (2022.01)

(52) U.S. Cl.
CPC ......... *H04L 61/4511* (2022.05); *H04W 76/10* (2018.02); *H04L 2101/686* (2022.05)

(58) Field of Classification Search
CPC .............................. H04W 24/10; H04L 12/28
USPC ................................ 370/329, 401, 402, 403
See application file for complete search history.

(56) References Cited

U.S. PATENT DOCUMENTS

| 7,340,746 | B2 | 3/2008 | Deshpande |
| 7,450,499 | B2 | 11/2008 | Park et al. |
| 7,830,911 | B2 | 11/2010 | Jimmei |
| 7,920,589 | B2 | 4/2011 | Pennec et al. |
| 8,300,637 | B1 | 10/2012 | Bennett et al. |
| 8,396,069 | B1 | 3/2013 | Pierce et al. |
| 8,400,943 | B2 | 3/2013 | Dec et al. |
| 8,665,873 | B2 | 3/2014 | Sarikaya et al. |
| 8,954,558 | B2 | 2/2015 | Choi et al. |
| 9,015,327 | B2 | 4/2015 | Naidu et al. |
| 9,185,071 | B2 | 11/2015 | Haddad et al. |

(Continued)

FOREIGN PATENT DOCUMENTS

| CN | 101594282 B | 6/2011 |
| EP | 2458824 A1 | 5/2012 |

(Continued)

*Primary Examiner* — Dang T Ton
(74) *Attorney, Agent, or Firm* — Perkins Coie LLP

(57) ABSTRACT

A user plane function (UPF) of a telecommunications network configured to prioritize IPv6 addresses over IPv4 addresses for transmitting content over the telecommunications network from a content server to a user device. The UPF can receive a content request at including a uniform resource locator (URL) pointing to a resource on a host server. The UPF can also receive DNS queries including an AAAA and A record request. The UPF can forward the AAAA record and A record to a DNS server and receive an IPv6 and IPv4 address in response. The UPF can either delay A record transmission to the user device or transmit an x-header to the user device to facilitate an IPv6 client-server connection. The UPF can generate a data packet with the resource from the host server and transmit it to the user device using the IPv6 client-server connection.

20 Claims, 5 Drawing Sheets

(56) References Cited

U.S. PATENT DOCUMENTS

| | | |
|---|---|---|
| 9,191,317 B2 | 11/2015 | Wang |
| 9,419,940 B2 | 8/2016 | Zou et al. |
| 9,559,855 B2 | 1/2017 | Dec et al. |
| 9,742,731 B2 | 8/2017 | Maslak |
| 9,838,259 B1 | 12/2017 | Earnhart et al. |
| 9,882,866 B2 | 1/2018 | Zou et al. |
| 10,164,934 B1 | 12/2018 | Bittfield et al. |
| 10,165,091 B1 | 12/2018 | Bittfield et al. |
| 10,305,800 B2 | 5/2019 | Torres et al. |
| 10,778,637 B2 | 9/2020 | Jeong et al. |
| 11,095,559 B1 | 8/2021 | Garvia et al. |
| 11,245,663 B1 | 2/2022 | Bandeali et al. |
| 2003/0212771 A1 | 11/2003 | Kwon et al. |
| 2003/0225911 A1 | 12/2003 | Lee et al. |
| 2006/0104226 A1 | 5/2006 | Ahn |
| 2006/0159100 A1 | 7/2006 | Droms et al. |
| 2009/0290539 A1 | 11/2009 | Xia et al. |
| 2012/0259998 A1 | 10/2012 | Kaufman |
| 2012/0311660 A1 | 12/2012 | Park et al. |
| 2015/0106616 A1* | 4/2015 | Nix ................. H04L 63/061 713/170 |
| 2015/0163056 A1* | 6/2015 | Nix ................. H04B 1/3816 |
| 2018/0152345 A1 | 5/2018 | Zhang |

FOREIGN PATENT DOCUMENTS

| | | |
|---|---|---|
| KR | 20030040268 A | 5/2003 |
| WO | 2011157141 A2 | 12/2011 |
| WO | 2014047913 A1 | 4/2014 |
| WO | 2015085521 A1 | 6/2015 |
| WO | 2020093377 A1 | 5/2020 |

\* cited by examiner

USER PLANE FUNCTION CONFIGURED TO PRIORITIZE USING A PREFERRED INTERNET PROTOCOL TO ESTABLISH A CONNECTION BETWEEN USER DEVICE AND HOST SERVER

BACKGROUND

Internet Protocol version 4 (IPv4) is the fourth version of the Internet Protocol (IP). It is one of the core protocols of standards-based internet working methods in the Internet and other packet-switched networks. IPv4 is still used to route most Internet traffic today, even with the ongoing deployment of Internet Protocol version 6 (IPv6), its successor. IPv4 uses 32-bit addresses which limits the address space to 4294967296 (2^32) addresses.

In the 1980s, it became apparent that the pool of available IPv4 addresses was depleting at a rate that was not initially anticipated in the original design of the network. The main market forces that accelerated address depletion included the rapidly growing number of Internet users, who increasingly used mobile computing devices, such as laptop computers, personal digital assistants (PDAs), and smartphones with IP data services. In addition, high-speed Internet access was based on always-on devices.

The long-term solution to address exhaustion was a new version of the Internet Protocol, IPv6. IPv6 is an Internet Layer protocol for packet-switched internetworking and provides end-to-end datagram transmission across multiple IP networks, closely adhering to the design principles developed in IPv4. It provides a vastly increased address space, but also allows improved route aggregation across the Internet, and offers large subnetwork allocations of a minimum of 2^64 host addresses to end users. However, IPv4 is not directly interoperable with IPv6; as such, IPv4-only hosts cannot directly communicate with IPv6-only hosts. The permanent formal deployment of IPv6 commenced in 2006. Completion of IPv6 deployment is expected to take considerable time. As such, intermediate transition technologies are necessary to permit hosts to participate in the Internet using multiple versions of the protocol.

BRIEF DESCRIPTION OF THE DRAWINGS

Detailed descriptions of implementations of the present invention will be described and explained through the use of the accompanying drawings.

Figure 1:
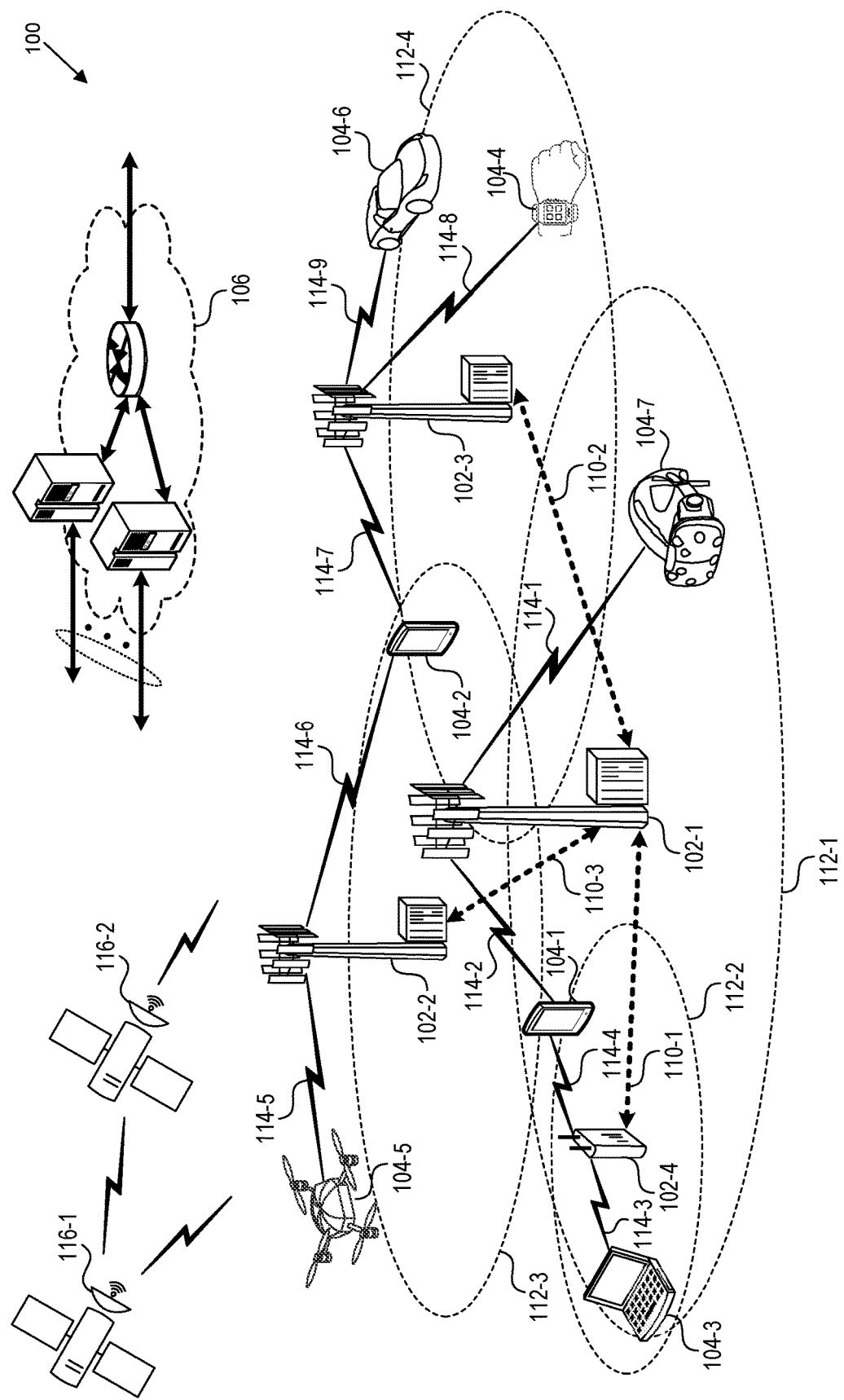
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes improvements to telecommunications technology. For example, the disclosed technology can help direct user devices to establish IPv6 connections in lieu of an IPv4 connection when both options are available. Prioritizing an IPv6 connection in lieu of an IPv4 connection can reduce address exhaustion (e.g., increase service reliability) and increase network speeds (e.g., when the alternative to using an IPv6 address is relying on network address translation (NAT)).

Typically, systems can use the first IP address they can find to establish a communication channel with a host server (e.g., a content delivery network (CDN)). For example, if two DNS queries are transmitted (an A record request and an AAAA record request) and an A record request is received first the system can establish a communication channel using IPv4 instead of IPv6. This can cause complications when establishing the communication channel, especially if the host server is configured to use IPv6 and blacklist IPv4 addresses. One common approach to solve this problem is to whitelist IPv4 addresses. However, manually whitelisting IPv4 addresses is labor-intensive and tedious.

The disclosed technology solves the aforementioned problem without a laborious manual intervention by configuring a user plane function (UPF) to prioritize an IPv6 connection when requesting content from a content distribution network (host server) (e.g., encouraging communication using IPv6 when streaming content). The UPF can act as an intermediary between a user device and the host server. As such the UPF can control and modify transmissions between the user device and the host server. In particular, the UPF can identify a content request made by a user device (e.g., user associated with a user device selects a movie on a streaming application). In an attempt to facilitate a host server connection, the UPF can perform two DNS queries. While IPv6 is preferred due to address exhaustion associated with IPv4, the IPv4 address is still necessary if the host server does not support IPv6. Therefore, two DNS queries are necessary to determine the IPv4 address and the IPv6 address associated with the content request.

In one example, the disclosed technology can ensure that the UPF transmits an IPv6 address prior to an IPv4 address. In some implementations, the UPF can receive both the AAAA record (e.g., the IPv6 address) and the A record (e.g., the IPv4 address). The UPF can delay the transmission of the A record to the user device until after the AAAA record is successfully transmitted. By delaying transmission of the A record to the user device until after the AAAA record is successfully transmitted, the UPF can ensure that if the user device is configured to use the first received IP address, it will use the IPv6 address determined by the AAAA record request.

In another example, the disclosed technology can transmit an x-header containing instructions to wait for an IPv6 transmission. The UPF can transmit the x-header to a data packet sent to the user device. The x-header can include instructions to the user device requesting that the user device waits until the IPv6 address is transmitted from the UPF to the user device. By attaching the x-header the system can have a redundant way to ensure an IPv6 address is used for transmission.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
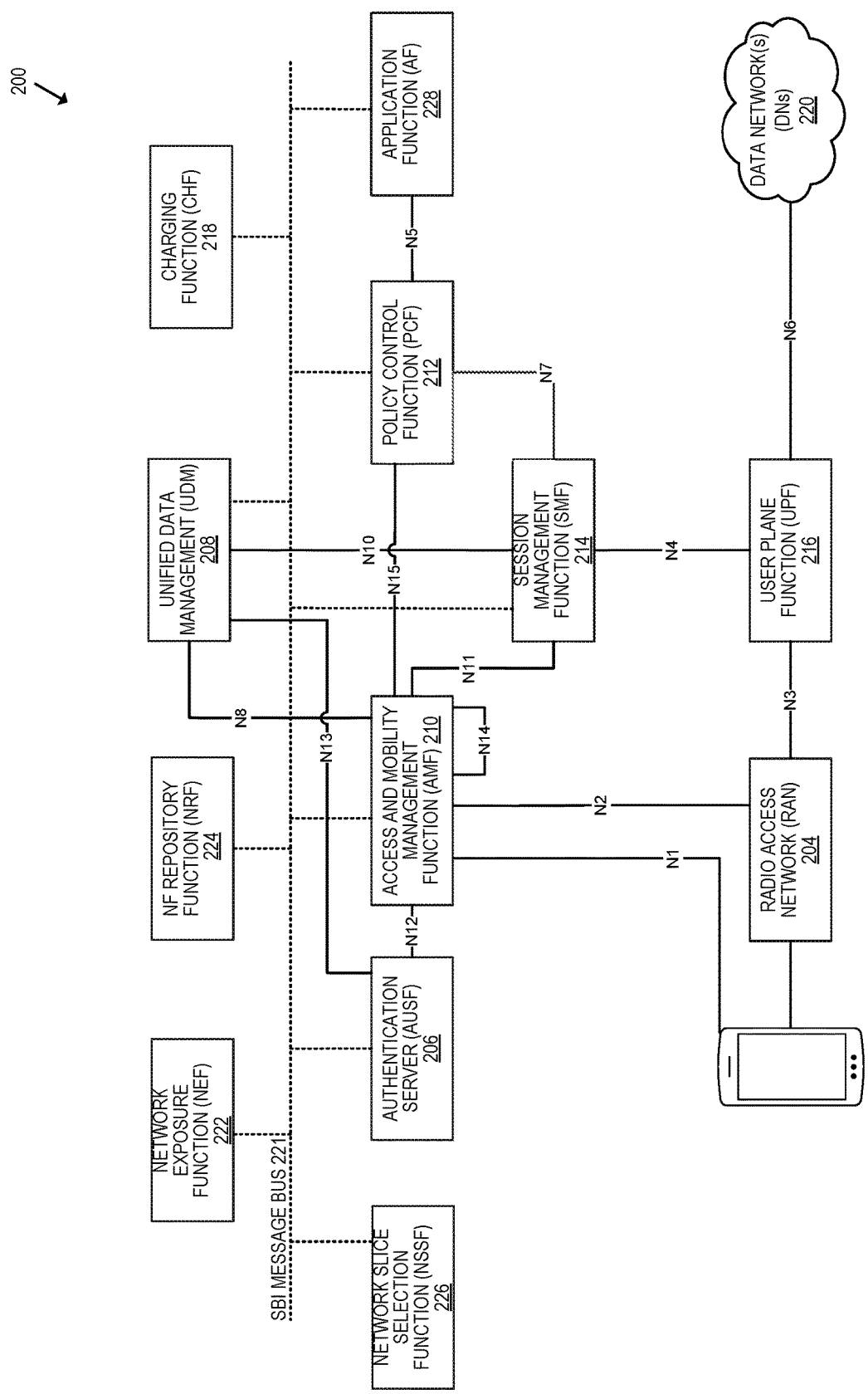
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Configured UPF

The disclosed technology includes a user plane function (UPF) that can prioritize establishing a client-server connection that uses a preferred Internet protocol when there are multiple internet protocols that are available for the client-server connection. The examples described herein include prioritizing IPv6 as a preferred protocol over IPv4; however, the opposite is within the scope of this disclosure. Moreover, the described technology can be implemented to prioritize any Internet protocol over another, when multiple are available for establishing a client-server connection between a user device and a host server through a UPF.

Figure 3:
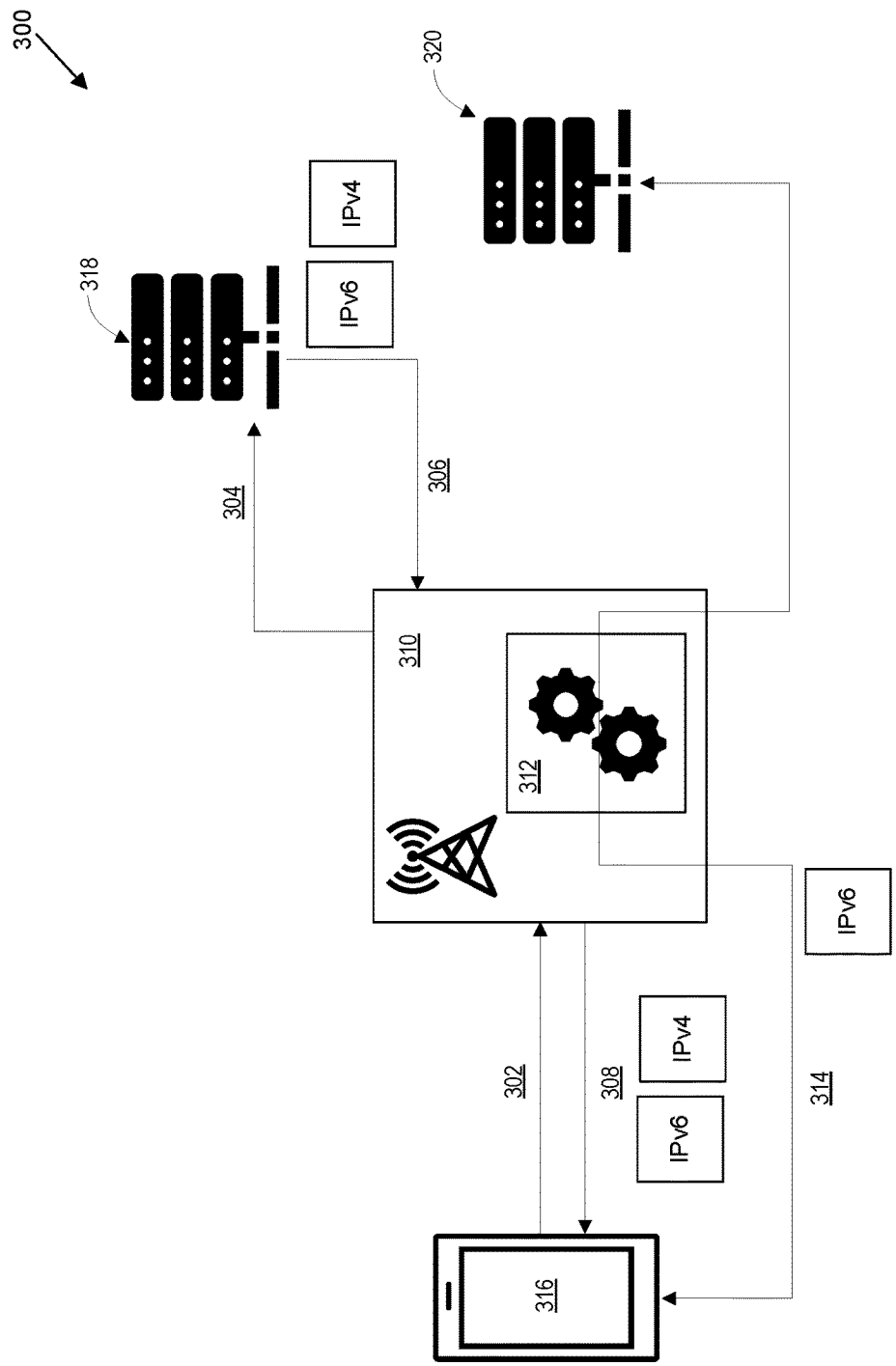
FIG. 3 is a block diagram illustrating a user plane function (UPF) configured to prioritize a preferred Internet protocol for establishing a client-server connection between a user device and a host server.

FIG. 3 is a block diagram illustrating an example of a UPF that is configured to prioritize an IPv6 connection between a user device and a host server. System 300 can include telecommunications architecture 310 which can include various 5G core NFs (see, e.g., architecture 200 (FIG. 2)). UPF 312 can be configured to encourage IPv6 transmission between user device 316 and host server 320.

Telecommunications architecture 310 can direct a content request from user device 316 to UPF 312 at 302. The content request 302 from user device 316 can include a uniform resource locator (URL) that points to a resource on a host server. To accurately communicate with the host server, the user device can initiate DNS queries to resolve the IPv4 address (e.g., an A record request) and the IPv6 address (e.g., an AAAA record request) associated with the URL in the content request.

Telecommunications architecture 310 can direct both the AAAA record request and the A record request to UPF 312. UPF 312 can forward the two DNS queries to DNS server 318 at 304. In response to receiving the forwarded AAAA record request and the forwarded A record request, DNS server 318 can respond by transmitting an IPv6 address and an IPv4 address to UPF 312 in response to the AAAA record request and the A record request respectively in step 306.

After receiving the AAAA record and the A record, UPF 312 can facilitate a client-server connection. In one example, UPF 312 facilitates the client-server connection by delaying the transmission of the A record at 308 until the IPv6 address is received on user device 316. In another example, UPF 312 facilitates the client-server connection by transmitting, in conjunction with the AAAA record and the A record, an x-header that instructs the user device to use the IPv6 address if available and if not wait for a time period to ensure receipt of a transmitted IPv6 address. The x-header can be contained in an HTTP packet.

Delaying transmission of the IPv4 address ensures that the IPv6 address is received at user device 316 first, which increases the likelihood that user device 316 uses the IPv6 address instead of the IPv4 address. In some implementations, user device 316 uses the first received IP address to initiate a client-server connection with host server 320. For example, user device 316 can use the IPv6 address provided by UPF 312 to initiate a client-server connection with host server 320 using the IPv6 address at 314 because the IPv6 address was received prior to the IPv4 address.

In some implementations, after receiving the AAAA record and the A record, UPF 312 transmits an x-header to user device 316. The x-header instructs the user device to use the IPv6 address forwarded from the DNS server. This helps ensure that the client-server connection uses IPv6 instead of IPv4. However, if an IPv6 address is not available due to a delay in transmission from UPF 312, then the x-header can instruct user device 316 to wait for a time period to ensure receipt of a transmitted IPv6 address. In one example, the time period is in the tens of milliseconds range to be imperceptible to a user associated with the user device 316. The x-header can be contained in an HTTP packet.

User device 316 can establish a client-server connection using the IPv6 address. The client-server connection allows communication between the user device and the host server. UPF 312 can act as an intermediary between the user device and the host server to perform functions such as network address translation (NAT). UPF 312 can forward the content request to the host server using the client-server connection. Host server 320 can respond to the content request with the requested content. UPF 312 can generate a data packet that contains the requested content and transmit the data packet to user device 316.

As used herein, a "host server" can refer to a server intended to control the confidentiality, integrity, and accessibility of one or more digital assets or provide one or more services to clients. A host server can provide digital assets or services to devices (e.g., host server 320 providing requested content to user device 316). The host server can respond to requests for digital assets or services from client devices (e.g., user device 316 sending a content request to host server 320).

As used herein, a "content request" can refer to a request for content initiated by a client device that requests content from a host server. In some implementations, a content request is transmitted from a client device (e.g., user device 316) to a host server (e.g., host server 320) to request one or more digital assets or use a service offered by the host server. The content request can include a uniform resource locator (URL) that points to a resource on the host server.

As used herein, a "data packet" can refer to data that is transmitted over a network. The data packets can be transmitted in response to a content request. A data packet can contain information about the sender or receiver as well as requested content. In some implementations, a data packet is a direct copy of the requested content received from the host server or a smaller portion of the requested content received from the host server. A data packet can includes additional information or instructions for the user device such as an x-header. A data packet can be or include additional packets such as an HTTP packet with an x-header.

Data Flow

Figure 4:
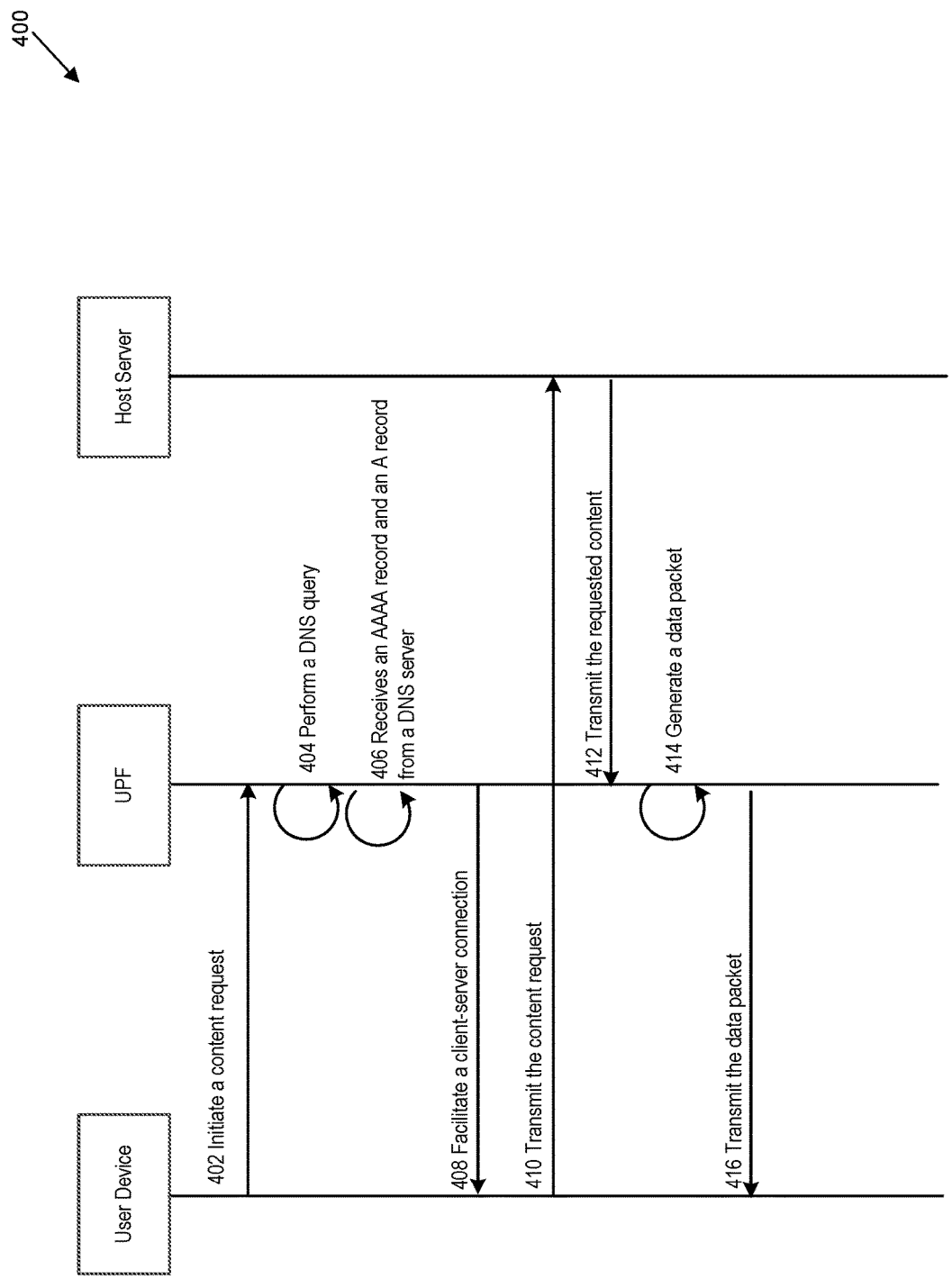
FIG. 4 is a data flow diagram that illustrates the data flow between a user device and a host server where the UPF is configured to prioritize a client-server connection that uses a preferred Internet connection.

FIG. 4 is a data flow diagram that illustrates the data flow 400 between a user device and a host server, where a UPF is configured to prioritize a client-server connection that uses a preferred Internet connection. For example, the UPF is responsible for packet routing and forwarding, packet inspections, and Quality of Server (QoS) handling. The UPF can communicate with a user device. For example, the UPF forwards and routes packets to and from a user device. The UPF can also communicate with a host server. For example, the UPF forwards and routes packets to and from a host server to the user device.

At 402, the UPF receives a content request from a user device. For example, the UPF can receive a content request from the user device which includes a uniform resource locator (URL) that points to a resource of a host server. A content request can include a request for a document, a photograph, audio, a video, or another digital asset stored on a server.

At 404, the UPF performs a DNS query. For example, the UPF receives two DNS queries for the URL from the user device such that the first DNS query is an AAAA record request and the second DNS query is an A record request. In one example, if a user device is trying to access a document from a website, the user device generates two DNS queries that get routed through the UPF. Of the two DNS queries the user device generated to access a document from a website, the first DNS query is an AAAA record request associated with the URL of the website and the second DNS query is an A record request associated with the URL of the website. After the UPF receives the DNS queries from the user device, the UPF can forward the requests to a DNS server. The DNS server can process the AAAA record request and the A record request and transmit the corresponding responses to the UPF.

At 406, the UPF receives an AAAA record and an A record from a DNS server.

For example, the UPF receives, from the DNS server, an AAAA record in response to the AAAA record request and receives an A record in response to the A record request. The AAAA record includes an IPv6 address associated with the URL, and the A record includes an IPv4 address associated with the URL.

At 408, the UPF facilitates the client-server connection by transmitting the AAAA record and the A record to the user device. The UPF can prioritize the use of the IPv6 address included in the AAAA record instead of the IPv4 address included in the A record to establish a client-server connection.

In some implementations, prioritizing the client-server connection to use the IPv6 address of the AAAA record includes holding the A record at the UPF for a time period sufficient to transmit the AAAA record before the A record. In some implementations, the UPF prioritizes the use of the IPv6 address by withholding the A record until the AAAA record is received. For example, the UPF can forward the AAAA record to the user device while delaying transmission of the A record at the UPF.

In some implementations, prioritizing the client-server connection to use the IPv6 address associated with the AAAA record includes transmitting an extension header (x-header) including instructions to use the IPv6 address instead of the IPv4 address. The extension header (x-header) is transmitted to the user device in addition to the AAAA record and the A record. For example, the UPF can transmit an x-header to the user device including instructions to use the IPv6 address instead of the IPv4 address, the AAAA record, and the A record.

The system can establish a connection even when IPv6 cannot be used for the entirety of the connection. In one example, the client-server connection is unable to use the IPv6 address for the host server based on network topology information that includes information about an IP configuration setting for the host server. That is, the system can determine that the client-server connection is unable to use the IPv6 address for the host server based on network topology information. In another example, the client-server connection is unable to use the IPv6 address based on a result code field received in response to the AAAA record request. The result code field can include a non-existent domain (NXDOMAIN) value. In yet another example, the system detects IPv6 packets being dropped over the client-server connection. In particular, the system can determine that a firewall between the user device and the host server is configured to block IPv6 traffic, thus causing packets to drop.

In response to determining that IPv6 cannot be used for an entirety of the connection, the system can establish a first leg of the client-server connection between the UPF and the host server to use the IPv4 address of the A record. The system establishes a second leg of the client-server connection between the user device and the UPF to use the IPv6 address of the AAAA record. The system maps the IPv6 address to the IPv4 address such that the first leg uses IPv6 and the second leg uses IPv4 to establish the client-server connection between the user device and the host server.

In some implementations, the system determines that the client-server connection failed after a first time period elapsed without traffic flowing over the connection. The first time period can be determined by the UPF as a value greater than an average time to detect traffic flow on a typical client-server connection. Determining the client-server connection failed can include detecting an absence of traffic at the UPF between the user device and the host server. If the system detects an absence of traffic, the system can forward the A record to the user device after forwarding the AAAA record to the user device. In some implementations, forwarding of the A record is delayed for a second time period sufficient to ensure transmission of the AAAA record to the user device.

At 410, the user device transmits the content request to the host server using the client-server connection. Once the connection is established, the client device can communicate with the host server over the client-server connection. The user device can use the client-server connection to transmit the content request to the host server, in one example.

At 412, the host server transmits content to the UPF using the client-server connection. The UPF can forward the content request received from the user device to the host server using the client-server connection.

At 414, the UPF can generate a data packet to transmit to the user device and at 416, the UPF can transmit the data packet to the user device. The data packet can include the requested resource from the host server. The UPF can forward the data packet to the user device in response to the initial content request.

Computer System

Figure 5:
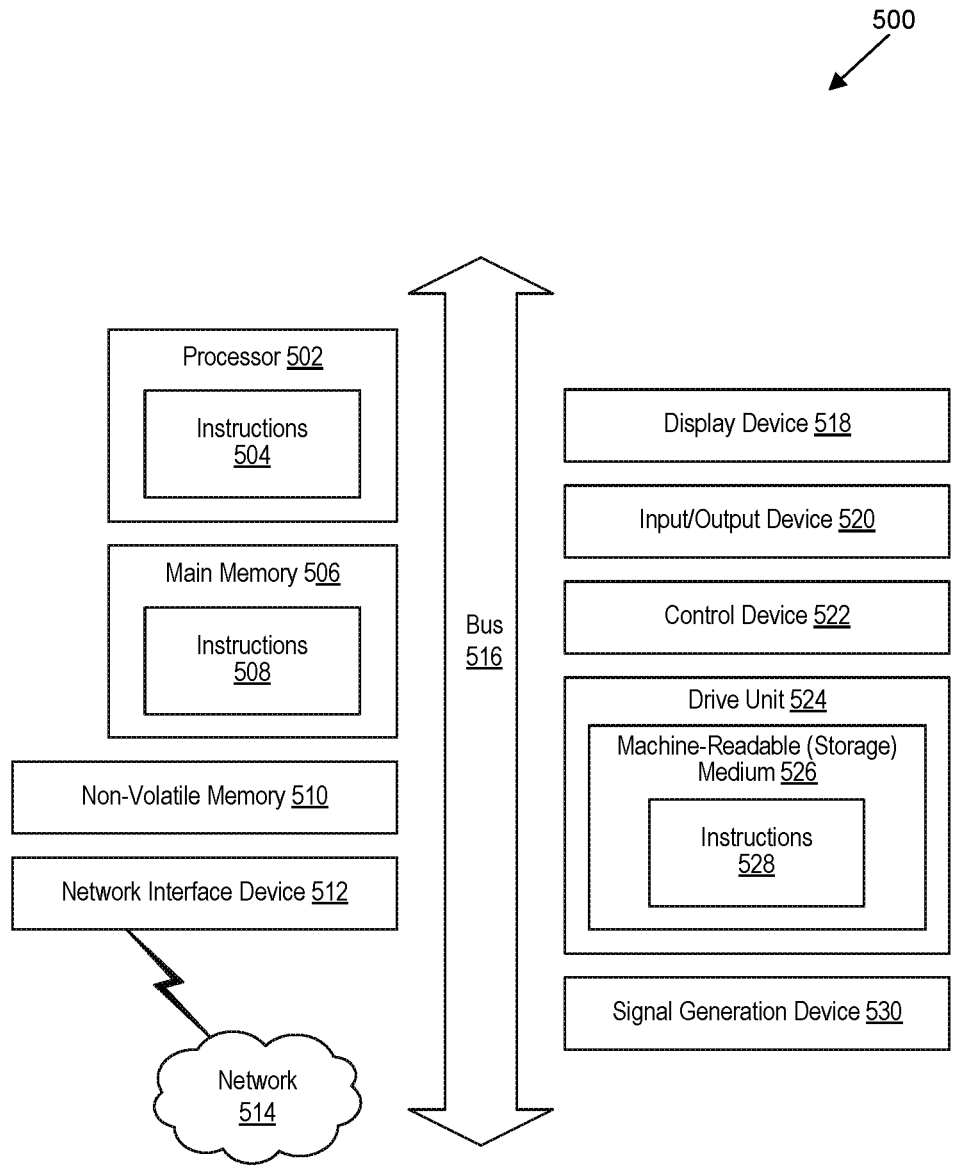
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method performed by a user plane function (UPF) of a telecommunications network to use Internet Protocol version 6 (IPv6) addresses instead of Internet Protocol version 4 (IPV4) addresses for communicating content over the telecommunications network from a content server to a user device, the method comprising:
   receiving, from a user device, a content request at the UPF,
      wherein the content request includes a uniform resource locator (URL), and
      wherein the URL points to a resource on a host server;
   receiving, from the user device, a first domain name system (DNS) query for the URL and a second DNS query for the URL,
      wherein the first DNS query includes an Address Address Address Address (AAAA) record request and the second DNS query includes an Address (A) record request;
   forwarding the first DNS query and the second DNS query to a DNS server;
   receiving, at the UPF, from the DNS server, an AAAA record in response to the AAAA record request and an A record in response to the A record request,
      wherein the AAAA record includes an IPV6 address associated with the URL, and
      wherein the A record includes an IPv4 address associated with the URL;
   prioritize the use of the IPV6 address included in the AAAA record instead of the IPV4 address included in the A record to establish a client-server connection by:
      (i) forwarding the AAAA record to the user device while delaying transmission of the A record at the UPF, or
      (ii) transmitting an extension header (x-header) to the user device including the AAAA record, the A record, and instructions to use the IPV6 address instead of the IPV4 address; and
   enabling the client-server connection between the user device and the host server based on the IPV6 address.

2. The method of claim 1 further comprising:
   determining that the client-server connection is unable to use the IPV6 address for the host server based on network topology information,
      wherein the network topology information includes information about an IP configuration setting for the host server;
   establishing a first leg of the client-server connection between the UPF and the host server to use the IPV4 address of the Address (A) record;

establishing a second leg of the client-server connection between the user device and the UPF to use the IPV6 address of the Address Address Address Address (AAAA) record; and mapping the IPV6 address to the IPV4 address such that the first leg uses IPV6 and the second leg uses IPV4 to establish the client-server connection between the user device and the host server.

3. The method of claim 1 further comprising:

detecting that the client-server connection is unable to use the IPV6 address based on a result code field received in response to the Address Address Address Address (AAAA) record request,
wherein the result code field comprises a non-existent domain (NXDOMAIN) value;

establishing a first leg of the client-server connection between the UPF and the host server to use the IPV4 of the Address (A) record;

establishing a second leg of the client-server connection between the user device and the UPF to use the IPV6 address of the AAAA record; and converting the IPV6 address to the IPV4 address such that the first leg uses IPV6 and the second leg uses IPv4 to establish the client-server connection between the user device and the host server.

4. The method of claim 1 further comprising:

detecting IPv6 packets dropped over the client-server connection;

determining that a firewall between the user device and the host server is configured to block IPV6 traffic;

establishing a first leg of the client-server connection between the UPF and the host server to use the IPV4 address of the Address (A) record;

establishing a second leg of the client-server connection between the user device and the UPF to use the IPV6 address of the Address Address Address Address (AAAA) record; and converting the IPV6 address to the IPV4 address such that the first leg uses IPV6 and the second leg uses IPv4 to establish the client-server connection between the user device and the host server.

5. The method of claim 1, wherein prioritizing the client-server connection to use the IPV6 address of the Address Address Address Address (AAAA) record comprises:

holding the Address (A) record at the UPF for a time period sufficient to transmit the AAAA record before the A record.

6. The method of claim 1, wherein prioritizing the client-server connection to use the IPV6 address associated with the Address Address Address Address (AAAA) record comprises:

transmitting the extension header (x-header) including instructions to use the IPV6 address instead of the IPV4 address.

7. The method of claim 6, further comprising:

determining that the client-server connection failed after a first time period elapsed without traffic flowing over the client-server connection,
wherein the first time period is determined by the UPF as a value greater than an average time to detect traffic flow on a typical client-server connection, and
wherein determining the client-server connection failed includes detecting an absence of traffic at the UPF between the user device and the host server; and forwarding the Address (A) record to the user device after forwarding the Address Address Address Address (AAAA) record to the user device,
wherein forwarding of the A record is delayed for a second time period sufficient to ensure transmission of the AAAA record to the user device.

8. A system comprising:

at least one hardware processor; and at least one non-transitory memory storing instructions, which, when executed by the at least one hardware processor, cause the system to:

receive, from a user device, a content request at a network function (NF),
wherein the content request includes a uniform resource locator (URL), and
wherein the URL points to a resource on a host server;

receive, from the user device, a first domain name system (DNS) query for the URL and a second DNS query,
wherein the first DNS query includes a first record request and the second DNS query includes a second record request;

forward the first DNS query and the second DNS query to a DNS server;

receive, at the NF, from the DNS server, a first record in response to the first record request and a second record in response to the second record request,
wherein the first record comprises a first Internet protocol address associated with the URL, and
wherein the second record comprises a second Internet protocol address associated with the URL;

forward the first record and the second record to the user device from the NF,
wherein the first record is forwarded to the user while the second record is held at the NF for a time period; and enable, using the first record, a client-server connection between the user device and the host server,
wherein the client-server connection uses the IPV6 address associated with the first record, and
wherein the connection is used to transmit network traffic.

9. The system of claim 8, wherein the first record corresponds to an Address Address Address Address (AAAA) record received from a DNS server, and wherein the AAAA record corresponds to an IPV6 address.

10. The system of claim 8 wherein the second record corresponds to an Address (A) record received from a DNS server, and wherein the A record corresponds to an IPV4 address.

11. At least one non-transitory computer-readable storage medium storing instructions, which, when executed by at least one data processor of a system, cause the system to:

receive, from a user device, a content request at a network function (NF),
wherein the content request includes a uniform resource locator (URL), and
wherein the URL points to a resource on a host server;

receive, from the user device, a first domain name system (DNS) query for the URL and a second DNS query for the URL,
wherein the first DNS query includes a first record request and the second DNS query includes a second record request;

forward the first DNS query and the second DNS query to a DNS server;

receive, at the NF, from the DNS server, a first record in response to the first record request and a second record in response to the second record request, wherein the first record includes a first Internet protocol address associated with the URL, and wherein the second record includes a second Internet protocol address associated with the URL;

forward the first record and the second record to the user device from the NF, wherein the NF transmits an extension header (x-header) to the user device instructing the user device to use the first address of the first record instead of the second address of the second record, the first record, and the second record; and enable a client-server connection between the user device and the host server based on the first address.

12. The at least one non-transitory computer-readable storage medium of claim 11, further comprising:

determining that the client-server connection is unable to use the first Internet protocol address for the host server based on network topology information, wherein the network topology information includes information about an IP configuration setting for the host server;

establishing a first leg of the client-server connection between the NF and the host server to use the second Internet protocol address of the second record;

establishing a second leg of the client-server connection between the user device and the NF to use the first Internet protocol address of the first record; and mapping the first Internet protocol address to the second Internet protocol address such that the first leg uses the first Internet protocol and the second leg uses the second Internet protocol to establish the client-server connection between the user device and the host server.

13. The at least one non-transitory computer-readable storage medium of claim 11, further comprising:

detecting that the client-server connection is unable to use the first Internet protocol address based on a result code field received in response to the first record request, wherein the result code field comprises a non-existent domain (NXDOMAIN) value;

establishing a first leg of the client-server connection between the NF and the host server to use the second Internet protocol of the second record;

establishing a second leg of the client-server connection between the user device and the NF to use the first Internet protocol address of the first record; and converting the first Internet protocol address to the second Internet protocol address such that the first leg uses first Internet protocol and the second leg uses second Internet protocol address to establish the client-server connection between the user device and the host server.

14. The at least one non-transitory computer-readable storage medium of claim 11, further comprising:

detecting first Internet protocol packets dropped over the client-server connection;

determining that a firewall between the user device and the host server is configured to block first Internet protocol traffic;

establishing a first leg of the client-server connection between the NF and the host server to use the second Internet protocol address of the second record;

establishing a second leg of the client-server connection between the user device and the NF to use the first Internet protocol address of the first record; and converting the first Internet protocol address to the second Internet protocol address such that the first leg uses the first Internet protocol and the second leg uses the second Internet protocol to establish the client-server connection between the user device and the host server.

15. The at least one non-transitory computer-readable storage medium of claim 11, wherein prioritizing the client-server connection to use the first Internet protocol address of the first record comprises:

holding the second record at the NF for a time period sufficient to transmit the first record before the second record.

16. The at least one non-transitory computer-readable storage medium of claim 11, wherein prioritizing the client-server connection to use the first Internet protocol address associated with the first record comprises:

transmitting the extension header (x-header) including instructions to use the first Internet protocol address instead of the second Internet protocol address.

17. The at least one non-transitory computer-readable storage medium of claim 16, further comprising:

determining that the client-server connection failed after a first time period elapsed without traffic flowing over the client-server connection, wherein the first time period is determined by the NF as a value greater than an average time to detect traffic flow on a typical client-server connection, and wherein determining the client-server connection failed includes detecting an absence of traffic at the NF between the user device and the host server; and forwarding the second record to the user device after forwarding the first record to the user device, wherein forwarding of the second record is delayed for a second time period sufficient to ensure transmission of the first record to the user device.

18. The at least one non-transitory computer-readable storage medium of claim 11, wherein the first record corresponds to an Address Address Address Address (AAAA) record received from the DNS server, and wherein the AAAA record corresponds to an IPV6 address.

19. The at least one non-transitory computer-readable storage medium of claim 11, wherein the second record corresponds to an Address (A) record received from the DNS server, and wherein the A record corresponds to an IPV4 address.

20. The at least one non-transitory computer-readable storage medium of claim 11, wherein the NF corresponds to a UPF.

* * * * *